United States Patent
Qin

(10) Patent No.: US 11,146,858 B2
(45) Date of Patent: Oct. 12, 2021

(54) METHOD AND APPARATUS FOR PUSHING VIDEO CONTENT

(71) Applicant: BEIJING MICROLIVE VISION TECHNOLOGY CO., LTD, Beijing (CN)

(72) Inventor: Lei Qin, Beijing (CN)

(73) Assignee: BEIJING MICROLIVE VISION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/979,262

(22) PCT Filed: Oct. 18, 2019

(86) PCT No.: PCT/CN2019/111870
§ 371 (c)(1),
(2) Date: Sep. 9, 2020

(87) PCT Pub. No.: WO2020/078450
PCT Pub. Date: Apr. 23, 2020

(65) Prior Publication Data
US 2021/0058675 A1    Feb. 25, 2021

(30) Foreign Application Priority Data

Oct. 19, 2018   (CN) .......................... 201811222548.5

(51) Int. Cl.
*H04N 21/466*    (2011.01)
*H04N 21/433*    (2011.01)
(Continued)

(52) U.S. Cl.
CPC ..... *H04N 21/4668* (2013.01); *H04N 21/4334* (2013.01); *H04N 21/44008* (2013.01);
(Continued)

(58) Field of Classification Search
CPC .......... H04N 21/4668; H04N 21/4334; H04N 21/44008; H04N 21/4425; H04N 21/4667;
(Continued)

(56) References Cited

U.S. PATENT DOCUMENTS

2007/0078982 A1*   4/2007   Aidun ................. G06F 11/2035
                                                                709/225
2011/0007141 A1*   1/2011   Hirano ..................... H04N 5/63
                                                                 348/61

FOREIGN PATENT DOCUMENTS

CN          103152617 A         6/2013
CN          103838755 A         6/2014
(Continued)

OTHER PUBLICATIONS

International Patent Application No. PCT/CN2019/111870; Int'l Search Report; dated Feb. 3, 2020; 2 pages.

*Primary Examiner* — Alexander Gee
(74) *Attorney, Agent, or Firm* — BakerHostetler

(57) ABSTRACT

Disclosed are a video content push method and apparatus, the method comprising: when a primary disaster recovery system of a video recommendation service fails, activating a standby disaster recovery system; receiving a video access request sent by an application client, and invoking first historical video content stored in middleware and obtained from historical video recommendations of the video recommendation service according to a preset proportion; pushing the first historical video content to the application client for playback. The method removes the dependence of recovery on other services, so that a recovery solution is more robust, thereby increasing the stability of video content pushing.

11 Claims, 5 Drawing Sheets

(51) Int. Cl.
*H04N 21/44* (2011.01)
*H04N 21/4425* (2011.01)
*H04N 21/472* (2011.01)
*H04N 21/25* (2011.01)
*H04N 21/442* (2011.01)
*H04N 21/24* (2011.01)
*H04N 21/258* (2011.01)
*H04N 21/23* (2011.01)
*H04N 21/231* (2011.01)
*H04N 21/443* (2011.01)
*H04N 21/858* (2011.01)

(52) U.S. Cl.
CPC ..... *H04N 21/4425* (2013.01); *H04N 21/4667* (2013.01); *H04N 21/47217* (2013.01)

(58) Field of Classification Search
CPC ........... H04N 21/47217; H04N 21/432; H04N 21/251; H04N 21/25891; H04N 21/44222; H04N 21/4532
See application file for complete search history.

(56) References Cited

FOREIGN PATENT DOCUMENTS

| | | |
|---|---|---|
| CN | 108156013 A | 6/2018 |
| CN | 108322337 A | 7/2018 |
| CN | 109600672 A | 4/2019 |

\* cited by examiner

METHOD AND APPARATUS FOR PUSHING VIDEO CONTENT

CROSS-REFERENCE TO RELATED APPLICATION

This application is the U.S. National Stage of International Application No. PCT/CN2019/111870, filed on Oct. 18, 2019, which claims the priority of Chinese Patent Application No. 201811222548.5 filed on Oct. 19, 2018, the entire content of which is incorporated herein by reference.

TECHNICAL FIELD

The present disclosure relates to a field of Internet technologies, in particular to a method and apparatus for pushing a video content.

BACKGROUND ART

With the popularity of Internet, cost and barrier of accessing to the Internet are getting lower, and as traffics in websites increase and data sources are the uncertain, errors often occur. Taking video pushing as an example, when a video recommendation service fails, users cannot obtain any video content. A disaster recovery solution can push video contents to users when the video recommendation service fails.

In related technologies, the disaster recovery solution generally stores popular videos through item_list or redis, and when the video recommendation service fails, the video recommendation service push the popular videos by accessing the item_list or redis. However, the disaster recovery solution depends on item_list or redis service. When the depended services or other basic services (e.g., consul) fail, the videos cannot be pushed, so that the disaster recovery solution is not robust enough.

SUMMARY OF THE INVENTION

According to a first aspect of the present disclosure, a method for pushing a video content is provided, including: activating a standby disaster recovery system when a primary disaster recovery system of a video recommendation service fails; receiving a video access request sent by an application client; invoking a first historical video content stored in a middleware and obtained at a preset ratio from historical recommendation videos of the video recommendation service and pushing the first historical video content to the application client for playback.

According to an embodiment of the present disclosure, after activating the standby disaster recovery system, the historical video content stored in the middleware may be directly invoked, and in the case of other services breakdown or failure, the historical video content may also be obtained and pushed, thus the dependence of disaster recovery on other services is eliminated so that the disaster recovery solution is more robust and the stability of pushing video contents is proved.

According to an embodiment of the present disclosure, the method further includes: recording a corresponding relationship between a first video identifier of the first historical video content and a user identifier of the application client; and filtering video contents to be pushed to the application client based on the first video identifier after the video recommendation service or the primary disaster recovery system is recovered.

According to an embodiment of the present disclosure, the method further includes: before the invoking the first historical video content stored in the middleware and obtained at the preset ratio from historical recommendation videos of the video recommendation service: detecting whether a video content module fails; and activating a first interface of the standby disaster recovery system associated with the middleware when the video content module fails; and wherein the invoking the first historical video content includes: invoking the first historical video content stored in the middleware and obtained at the preset ratio from historical recommendation videos of the video recommendation service by using the first interface of the standby disaster recovery system.

According to an embodiment of the present disclosure, the method further includes: activating a second interface of the standby disaster recovery system associated with the local file when the video content module operates normally; invoking a second video identifier stored in the local file and obtained at a preset ratio from historical recommendation videos of the video recommendation service by using a second interface of the standby disaster recovery system; obtaining a second historical video content corresponding to the second video identifier from the video content module; and sending the second historical video content to the application client.

According to an embodiment of the present disclosure, the method further includes: disactivating the primary disaster recovery system and the standby disaster recovery system when the video recommendation service is recovered; receiving a video access request sent by the application client and obtaining a third video identifier corresponding to a user preference feature of the application client; obtaining a third video content corresponding to the third video identifier from the video content module; and sending the third video content to the application client.

According to a second aspect of the present disclosure, an apparatus for pushing a video content is provided, including: an activating module configured to activate a standby disaster recovery system when a primary disaster recovery system of a video recommendation service fails; an invoking module configured to receive a video access request sent by an application client and invoke a first historical video content stored in a middleware and obtained at a preset ratio from historical recommendation videos of the video recommendation service; and a pushing module configured to push the first historical video content to the application client for playback.

According to an embodiment of the present disclosure, the apparatus further includes a filtering module configured to: record a corresponding relationship between a first video identifier of the first historical video content and a user identifier of the application client, and filter video contents to be pushed to the application client based on the first video identifier after the video recommendation service or the primary disaster recovery system is recovered.

According to an embodiment of the present disclosure, the apparatus further includes a processing module configured to: detect whether a video content module fails, and activate a first interface of the standby disaster recovery system associated with the middleware when the video content module fails, and the invoking module is configured to invoke the first historical video content stored in the middleware and obtained at the preset ratio from historical recommendation videos of the video recommendation service by using the first interface of the standby disaster recovery system.

According to an embodiment of the present disclosure, the processing module may be further configured to: activate a second interface of the standby disaster recovery system associated with the local file when the video content module operates normally; invoke a second video identifier stored in the local file and obtained at a preset ratio from historical recommendation videos of the video recommendation service by using the second interface of the standby disaster recovery system; obtain a second historical video content corresponding to the second video identifier from the video content module; and send the second historical video content to the application client.

According to an embodiment of the present disclosure, the apparatus further includes a recommendation module configured to: disactivate the primary disaster recovery system and the standby disaster recovery system when the video recommendation service is recovered; receive a video access request sent by the application client and obtain a third video identifier corresponding to a user preference feature of the application client; obtain a third video content corresponding to the third video identifier from the video content module; and send the third video content to the application client.

According to a third aspect of the present disclosure, an electronic device is provided, including: a processor; and a memory configured executable programs; wherein the processor reads and executes executable programs stored in the memory for implementing the method for pushing a video content as described in the embodiments of the first aspect.

According to a fourth aspect of the present disclosure, a non-transitory computer-readable storage medium is provided, comprising a computer program operable to, when executed by a processor, implement the method for pushing a video content as described in the embodiments of the first aspect.

Additional aspects and advantages of the present disclosure will be partially given in the following description, and a part of them will become apparent from the following description, or be learned through the practice of the present disclosure.

THE DESCRIPTION OF DRAWINGS

The above and/or additional aspects and advantages of the present disclosure will become apparent and easily understood from the following description of the embodiments in conjunction with the accompanying drawings, in which.

DETAILED DESCRIPTION OF THE PREFERRED EMBODIMENT

Figure 1:
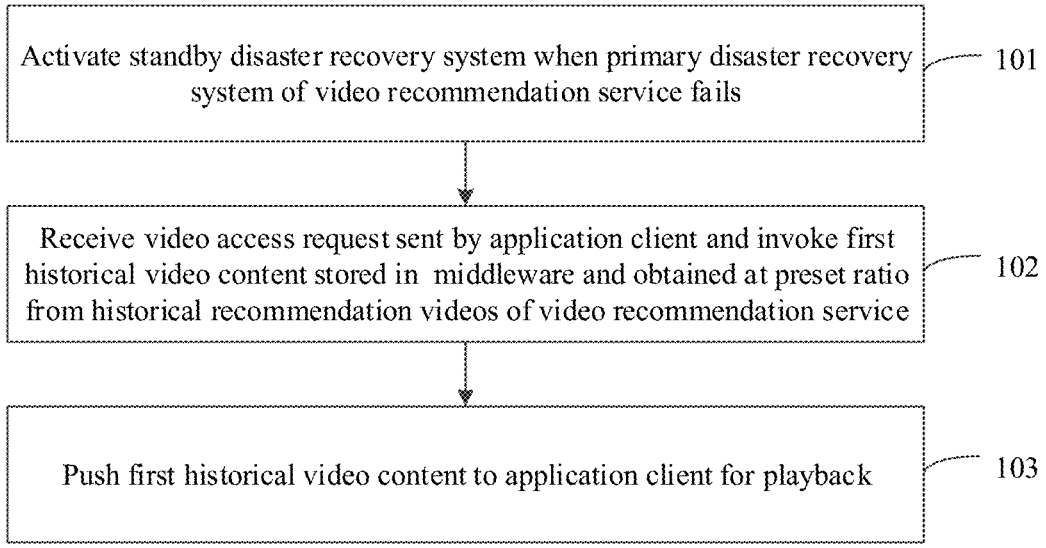
FIG. 1 is a schematic flowchart of a method for pushing a video content according to an embodiment of the present disclosure.

Embodiments of the present disclosure are described in detail below, and the embodiments are shown in the drawings, in which the same or similar reference numerals indicate the same or similar elements or elements having the same or similar functions throughout. The embodiments described below with reference to the drawings are exemplary and are intended to explain the present disclosure, and should not be construed as limiting the present disclosure.

The video content pushing method, apparatus, electronic device, and storage medium of the embodiments of the present disclosure are described below with reference to the drawings.

Currently, applications with video recommendation services may collect historical playing data of users to implement personalized video recommendations based on user preferences. In actual applications, it may occur a failure of the video recommendation service. Therefore, when the video recommendation service fails, a primary disaster recovery system may be activated to continue to push current popular videos to the application client, thereby ensuring the user experience. For example, it may respectively store the video ID (identifier) of the current popular video through redis and itemlist, and then obtain the popular video according to the video ID and push it to the application client.

However, since a primary disaster recovery system depends on services such as itemlist and redis, when the itemlist and redis themselves fail, the primary disaster recovery system cannot obtain popular videos for pushing. Therefore, the method for pushing a video content of the embodiment of the present disclosure may activate a standby disaster recovery system when the primary disaster recovery system of the video recommendation service is failure, and push the video content to the application client through the standby disaster recovery system.

FIG. 1 is a schematic flowchart of a method for pushing the video content according to an embodiment of the present disclosure. As shown in FIG. 1, the method for pushing video content includes the following steps.

Step 101: when the primary disaster recovery system of the video recommendation service fails, the standby disaster recovery system is activated. The primary disaster recovery system pushes the current popular video to the application client after the video recommendation service fails.

In the embodiment of the present disclosure, it may first detect whether the primary disaster recovery system fails before activating a standby disaster recovery system. When the primary disaster recovery system of the video recommendation service fails, the standby disaster recovery system is activated.

For example, it may detect whether the itemlist service fails, and then determine that the primary disaster recovery system occurs when the itemlist service fails, and activate the standby disaster recovery system.

In an embodiment of the present disclosure, when it is known that the primary disaster recovery system of the video recommendation service is normal, the current popular video may be pushed to the application client through the primary disaster recovery system. For example, it may respectively store the video ID (identifier) of the current popular video through redis and itemlist, and then obtain the popular video according to the video ID and push it to the application client.

Step 102: a video access request sent by an application client is received, and a first historical video content stored in a middleware is invoked, which is obtained at a preset ratio from historical recommendation videos of the video recommendation service.

In an embodiment of the present disclosure, when the server pushes videos to all users, the server may store the pushed recommendation video request result in the middleware at the preset ratio in real time. Furthermore, when receiving the video access request sent by the application client, the server may invoke the recommended video request result stored in the middleware.

For example, 1% of the video contents may be selected from the historical recommended videos to store in the middleware as the first historical video content. Furthermore, when receiving the video access request sent by the application client, the first historical video content is invoked from the middleware.

The first video content may be selected from all historical recommended videos, or randomly selected from historical recommended videos recommended to others.

As an example, the middleware may be a middleware server, and the first historical video content may be a uniform resource locator (URL) of the video.

The preset ratio may be obtained based on a large amount of experimental data, or may be set according to actual needs, which is not limited herein.

Step 103: the first historical video content is pushed to the application client for playback.

In this embodiment, since the first historical video content stored in the middleware has been obtained, the first historical video content may be directly pushed to the application client for playback.

As an example, it may randomly select one or more of the first historical video contents and push it/them to the application client for playback at the application client.

As another example, the first historical video content may also be scored according to a preset algorithm, and then the video content with the highest score is selected to be pushed to the application client for playback.

It should be noted that the above manner of pushing contents to the application client is only exemplary, and texts, pictures, and other forms of contents may also be pushed in addition to video contents, which are not limited herein.

In this embodiment, after the standby disaster recovery system is activated, the historical video contents stored in the middleware may be directly invoked, which realizes that the result of returning files is directly read at the middleware layer, and in the case of other services breakdown or failure, the historical video content may also be obtained and pushed, thus the dependence of disaster recovery on other services is eliminated so that the disaster recovery solution is more robust and the stability of pushing video contents is proved.

In summary, according to the method for pushing a video content of the embodiment of the present disclosure, when it knows that a primary disaster recovery system of a video recommendation service fails, a standby disaster recovery system is activated; a video access request sent by an application client is received; a first historical video content stored in a middleware is invoked, Which is obtained at a preset ratio from historical recommendation videos of the video recommendation service; and the first historical video content is pushed to the application client for playback. Therefore, the dependence of the disaster recovery on other services is eliminated, so that the disaster recovery solution is more robust, and the stability of pushing the video contents is improved.

Based on the above embodiment, the method for pushing a video content of the embodiment of the present disclosure may further deduplicate the pushed video contents to avoid repeated pushing.

Figure 2:
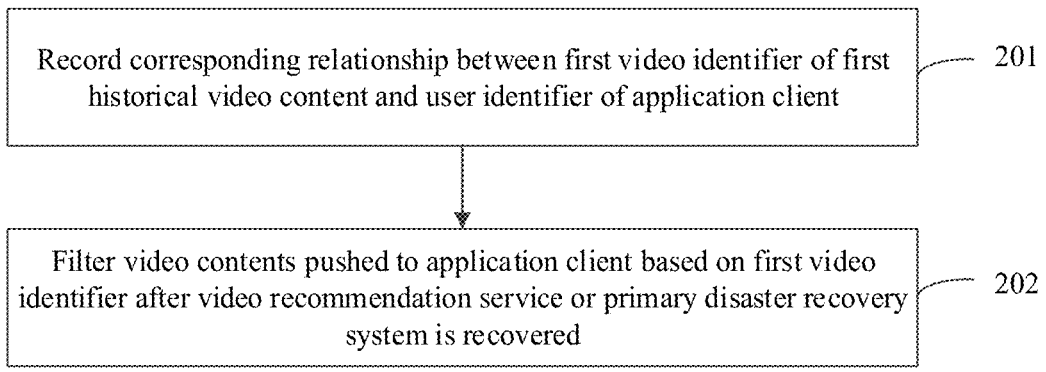
FIG. 2 is a schematic flowchart of another method for pushing a video content according to an embodiment of the present disclosure.

FIG. 2 is a schematic flowchart of another method for pushing a video content according to an embodiment of the present disclosure. As shown in FIG. 2, after the first historical video content is pushed to an application client for playback, the method for pushing a video content further includes the following steps.

Step 201: a corresponding relationship between a first video identifier of the first historical video content and a user identifier of the application client is recorded.

In an embodiment of the present disclosure, when the server receives the video access request sent by the application client, the server may obtain the user identifier of the application client and store it in the middleware. Furthermore, after the first historical video content is pushed to the application client, the first video identifier of the pushed first historical video content is obtained, and a corresponding relationship between the first video identifier and the user identifier is stored in the database.

The forms of the first video identifier and the user identifier include but are not limited to digital format, text format, and the like.

Step 202: After the video recommendation service or the primary disaster recovery system is recovered, the video contents to be pushed to the application client are filtered based on the first video identifier.

In an embodiment of the present disclosure, after the video recommendation service or the primary disaster recovery system is recovered, the user ID corresponding to the application client may be obtained when pushing video contents, and then the video contents to be recommended are filtered based on the first video ID corresponding to the user ID.

As an example, the user identifier is a, the corresponding first video identifier is A, and the video identifiers corresponding to the video to be recommended are A, B, and C, respectively, and then the first video identifier is matched with the video identifier of the video to be recommended. It is determined that the video A is the video that has been pushed, so the video A is deduplicated, and the videos B and C are pushed to the application client corresponding to the user identifier a.

It can be understood that after the video recommendation service or the primary disaster recovery system is recovered, the video that has been pushed by the standby disaster recovery system may be repeatedly pushed when the primary disaster recovery system pushes the videos. Therefore, when a service such as userinfo for obtaining a user ID operates normally, the server may obtain the user ID corresponding to the application client. Furthermore, by obtaining the corresponding relationship between the first video ID and the user ID, after the video recommendation service or the primary disaster recovery system is recovered, the video deduplication process may be performed when pushing videos to the application client corresponding to the user ID, so as to avoid pushing duplicate videos.

According to the method for pushing a video content of the embodiment of the present disclosure, after the video recommendation service or the primary disaster recovery system is recovered, the pushed video contents may be duplicated according to the first video identifier, thereby to avoid pushing duplicate videos and to improve user stickiness to the product.

Based on the above embodiment, when the video content module operates normally, the video identifier may also be obtained from a local file to obtain historical video content according to the video identifier for pushing.

Figure 3:
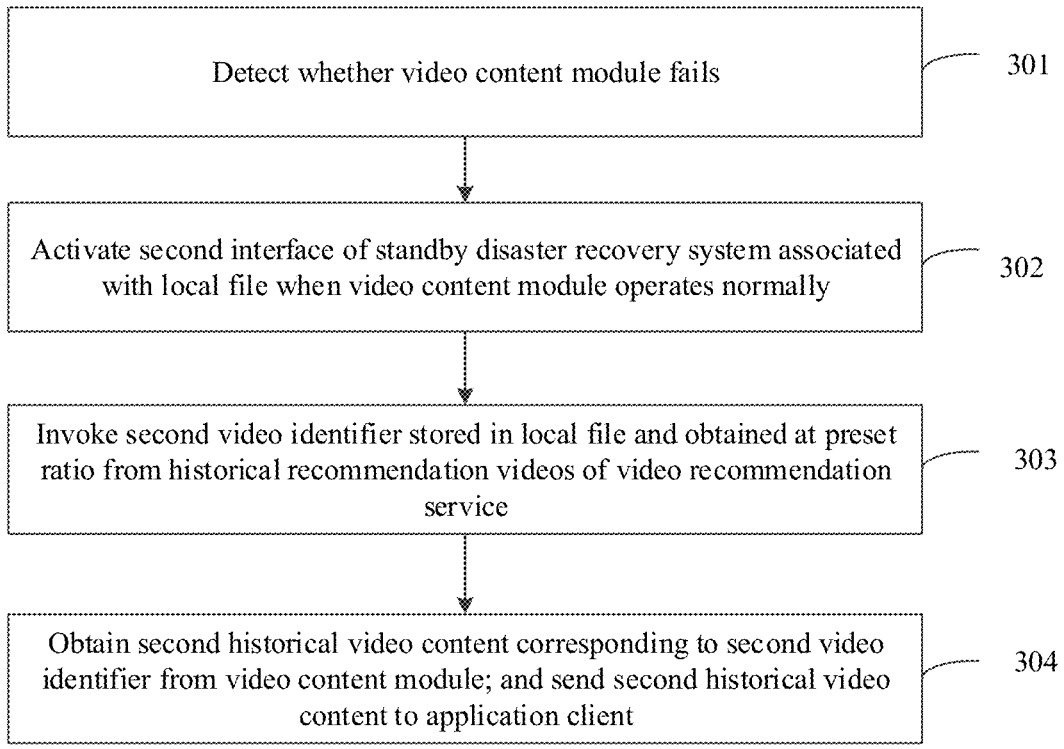
FIG. 3 is a schematic flowchart of another method for pushing a video content according to an embodiment of the present disclosure.

FIG. 3 is a schematic flowchart of another method for pushing a video content according to an embodiment of the present disclosure. As shown in FIG. 3, before the invoking the first historical video content stored in the middleware and obtained at the preset ratio from historical recommendation videos of the video recommendation service, the method for pushing a video content also includes the following steps.

Step 301: whether a video content module fails is detected.

As an example, it may detect whether the item service (the service that obtains video information) fails, and then determine that the video content module occurs when the item service fails.

In an embodiment of the present disclosure, when the video content module fails and the video content cannot be obtained according to the video identifier, a first interface of the standby disaster recovery system associated with the middleware is activated, and then the first historical video content stored in the middleware is invoked, and the first historical video content is pushed to the application client for playback.

Step 302, when the video content module works normally, a second interface of the standby disaster recovery system associated with the local file is activated.

The local file is a file stored locally on the server.

Step 303: a second video identifier stored in the local file is invoked and obtained at a preset ratio from historical recommendation videos of the video recommendation service.

In an embodiment of the present disclosure, when the server pushes videos to all users, the second video identifier of the pushed recommended video may be stored locally on the server at a preset ratio. Furthermore, after activating the second interface of the standby disaster recovery system, the second video identifier stored locally by the server may be invoked.

The preset ratio may be obtained based on a large amount of experimental data, or may be set according to actual needs. The forms of the second video identifier include but are not limited to digital forms, text forms, etc., which are not limited herein.

Step 304: a second historical video content corresponding to the second video identifier is obtained from the video content module; and the second historical video content is sent to the application client.

As an example, the corresponding relationship between the video ID and the historical video content and the historical video content may be stored in the video content module in advance, and after the second video ID is obtained, it may obtain the corresponding second historical video content by querying the corresponding relationship in the video content module and send it to the application client.

In this embodiment, when the primary disaster recovery system fails, if the video content module operates normally, such as the case where the redis fails but the item operates normally, the corresponding historical video content may also be obtained according to the video identifier stored in the local file to be pushed to the application client. Moreover, since the second interface of the standby disaster recovery system obtains the historical video content through an API (application programming interface), it may generate advertising results and increase advertising revenue.

The following describes situation with the recovery of the video recommendation service failure.

Figure 4:
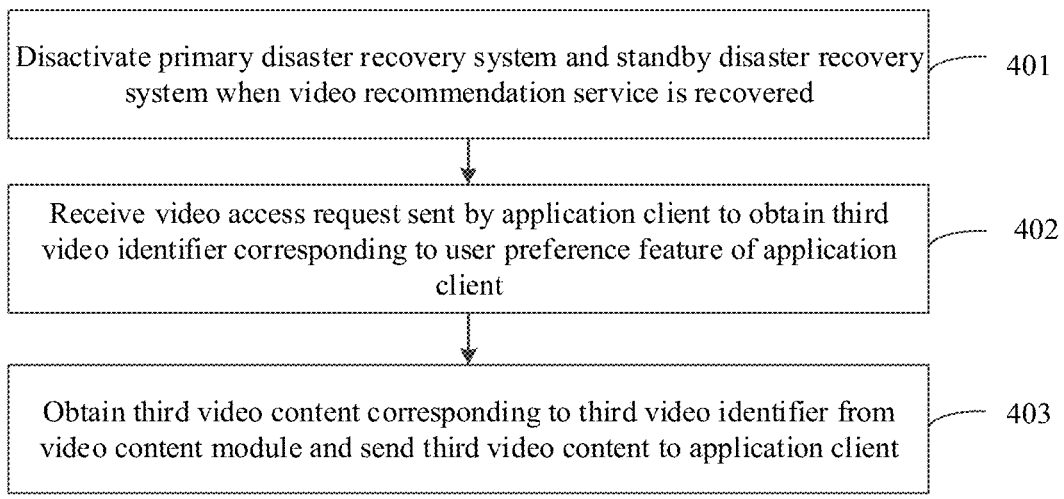
FIG. 4 is a schematic flowchart of another method for pushing a video content according to an embodiment of the present disclosure.

FIG. 4 is a schematic flowchart of another method for pushing a video content according to an embodiment of the present disclosure. As shown in FIG. 4, the method for pushing a video content includes the following steps.

Step 401, the primary disaster recovery system and the standby disaster recovery system are disactivated when the video recommendation service is recovered.

As a possible implementation, it is possible to detect whether the video recommendation service operates normally in real time, and when the video recommendation service operates normally, the primary disaster recovery system and the standby disaster recovery system are disactivated.

Step 402: it may receive a video access request sent by the application client to obtain a third video identifier corresponding to a user preference feature of the application client.

In an embodiment of the present disclosure, the user preference feature may be generated based on data such as the user's click preference, video category, and viewing time when browsing the video. Furthermore, when the application client requests the video, the user preference feature is carried in the video access request and sent to the server. The server filters the video to be pushed according to the user preference feature and obtains the third video identifier corresponding to the video that matches the user preference feature.

For example, when the user preference feature is a movie video, the server obtains the video identifier of the movie video from the videos to be pushed as the third video identifier.

The form of the third video identifier includes but is not limited to a text form, a digital form, and the like.

In an embodiment of the present disclosure, the video to be pushed may also be deduplicated according to the user identifier, of which the implementation manner is similar to that in the foregoing embodiment, and the details are not described herein again.

Step 403: a third video content corresponding to the third video identifier is obtained from the video content module; and the third video content is sent to the application client.

As an example, the corresponding relationship between the video ID and the historical video content and the historical video content may be stored in the video content module in advance, and after the third video ID is obtained, it may obtain the corresponding third historical video content by querying the corresponding relationship in the video content module, and send it to the application client. As a result, the videos are pushed according to user preferences, thereby improving the personalization of video pushing.

The following describes the actual application process.

Figure 5:
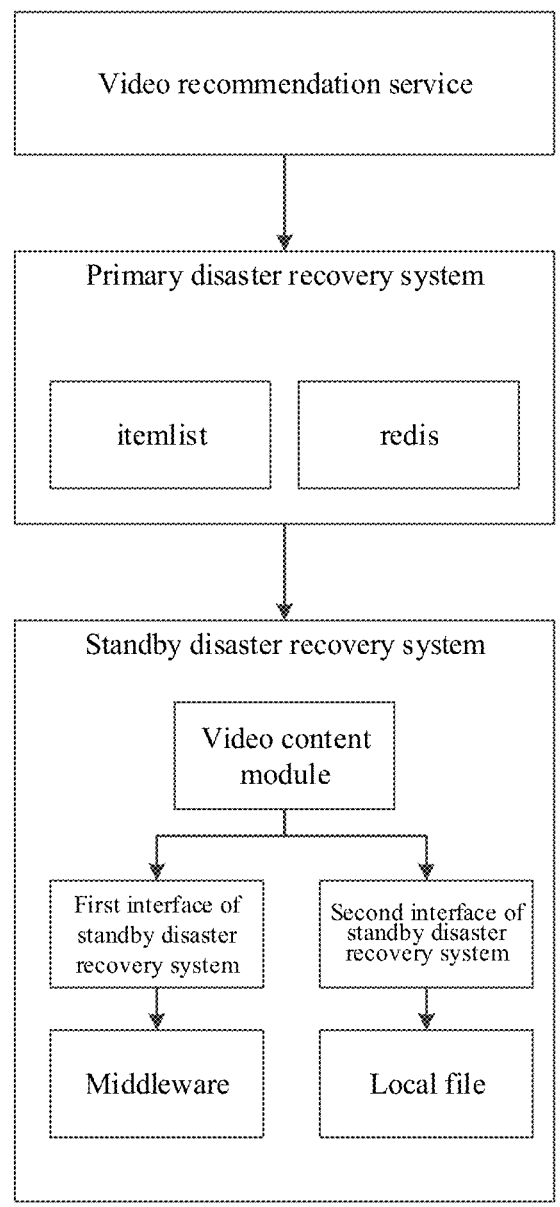
FIG. 5 is a schematic diagram of a practical application process according to an embodiment of the present disclosure.

Referring to FIG. 5, it may first detect whether the video recommendation service fails, and when the video recommendation service works normally, the videos are pushed through the video recommendation service. Furthermore, when the video recommendation service fails, the primary disaster recovery system pushes the videos. For example, the primary disaster recovery system may respectively store the video ID of the current popular video through the redis and itemlist, and then obtain the popular video according to the video ID and push it to the application client.

Further, when the primary disaster recovery system fails, the standby disaster recovery system is activated. It may first detect whether the video content module fails, and when the video content module works normally, the video identifier in the local file is obtained through the second interface of the standby disaster recovery system, and then the video content is obtained according to the video identifier for being pushed. When the video content module fails, the video content stored in the middleware is invoked and pushed through the first interface of the standby disaster recovery system. In addition, after pushing the video content, the user ID and the corresponding video ID may also be obtained to facilitate deduplication when the video recommendation service or the primary disaster recovery system is recovered, so as to avoid pushing duplicated contents. As a result, the dependence of disaster recovery on other services is eliminated, so that the disaster recovery solution is more robust, and the stability of pushing video contents is improved.

In order to implement the above embodiments, the present disclosure also proposes an apparatus for pushing a video content.

Figure 6:
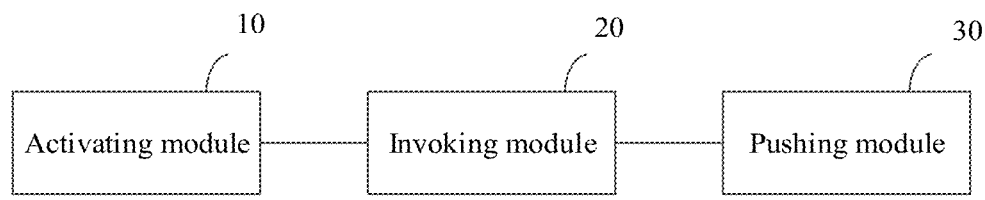
FIG. 6 is a schematic structural diagram of a video content pushing apparatus according to an embodiment of the present disclosure.

FIG. 6 is a schematic structural diagram of a video content pushing apparatus according to an embodiment of the present disclosure. As shown in FIG. 6, the apparatus includes an activating module 10, an invoking module 20, and a pushing module 30.

The activating module 10 may be configured to activate a standby disaster recovery system when a primary disaster recovery system of a video recommendation service fails, and wherein the primary disaster recovery system continues to push current popular videos to the application client after the video recommendation service fails.

The invoking module 20 may be configured to receive a video access request sent by an application client and invoke a first historical video content stored in a middleware and obtained at a preset ratio from historical recommendation videos of the video recommendation service.

The pushing module 30 may be configured to push the first historical video content to the application client for playback.

Figure 7:
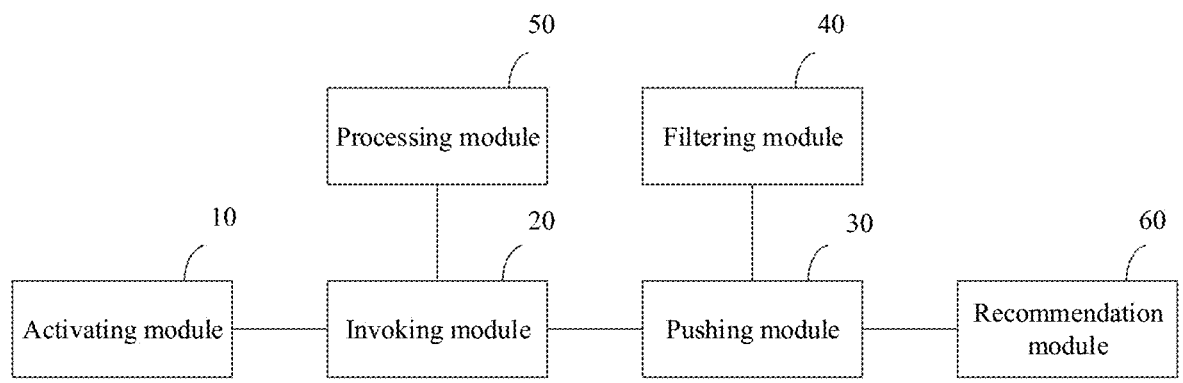
FIG. 7 is a schematic structural diagram of another video content pushing apparatus according to an embodiment of the present disclosure.

On the basis of FIG. 6, the video content pushing apparatus shown in FIG. 7 further includes a filtering module 40, a processing module 50, and a recommendation module 60.

The filtering module 40 may be configured to record a corresponding relationship between a first video identifier of the first historical video content and a user identifier of the application client; and filter the video contents pushed to the application client based on the first video identifier after the video recommendation service or the primary disaster recovery system is recovered.

The processing module 50 may be configured to detect whether a video content module fails, and if the video content module fails, activate a first interface of the standby disaster recovery system associated with the middleware.

Further, the processing module 50 may be further configured to: activate a second interface of the standby disaster recovery system associated with the local file when the video content module operates normally; invoke a second video identifier stored in the local file and obtained at a preset ratio from historical recommendation videos of the video recommendation service; obtain a second historical video content corresponding to the second video identifier from the video content module; and send the second historical video content to the application client.

Further, the recommendation module 60 may be configured to disactivate the primary disaster recovery system and the standby disaster recovery system when the video recommendation service is recovered; receive a video access request sent by the application client to obtain a third video identifier corresponding to a user preference feature of the application client; obtain a third video content corresponding to the third video identifier from the video content module; and send the third video content to the application client.

It should be noted that the explanation of the method for pushing a video content in the foregoing embodiment is also applicable to the video content pushing apparatus in this embodiment, and the details are not described herein.

Figure 8:
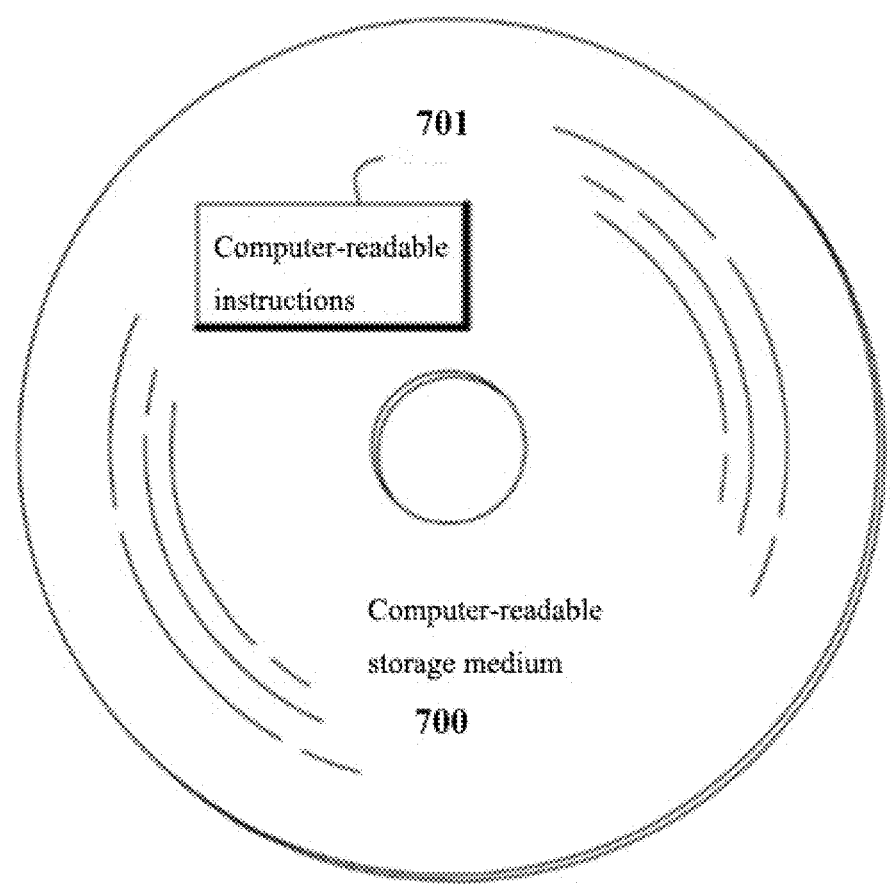
FIG. 8 is a schematic diagram illustrating a non-transitory computer-readable storage medium according to an embodiment of the present disclosure.

To implement the above embodiments, the present disclosure also proposes a non-transitory computer-readable storage medium. FIG. 8 is a schematic diagram illustrating a non-transitory computer-readable storage medium according to an embodiment of the present disclosure. As shown in FIG. 8, a non-transitory computer-readable storage medium 700 according to an embodiment of the present disclosure includes computer-readable instructions 701 stored thereon. When the non-transitory computer readable instructions 701 are executed by the processor, all or part of the steps of the foregoing method for pushing a video content of the embodiments of the present disclosure are performed.

Figure 9:
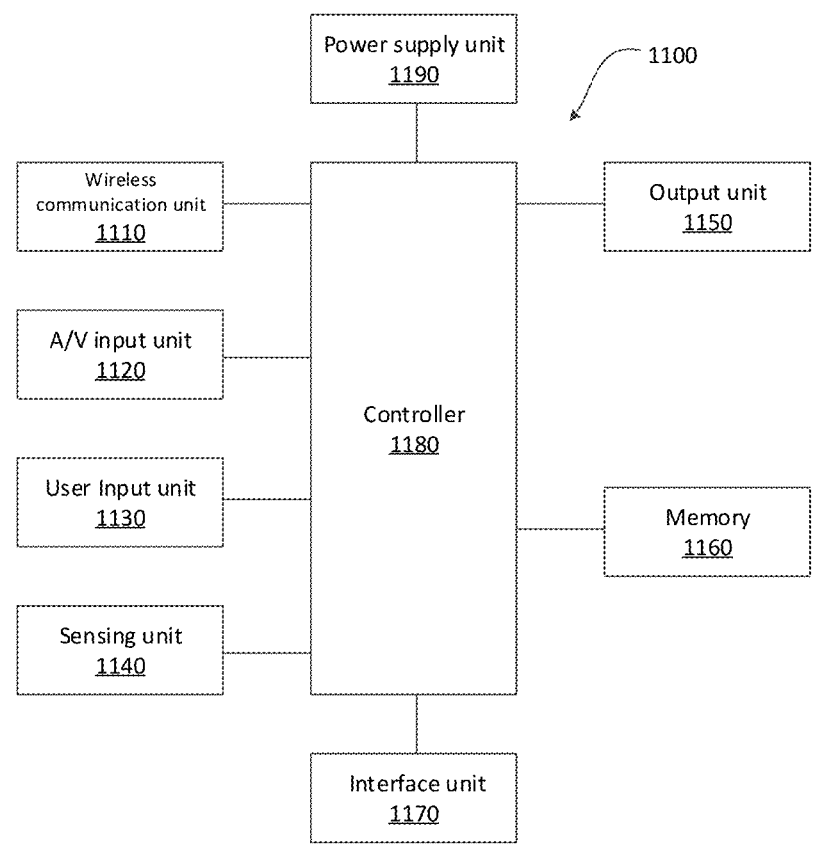
FIG. 9 is a schematic diagram illustrating a hardware structure of an electronic device according to an embodiment of the present disclosure.

FIG. 9 is a schematic diagram illustrating a hardware structure of an electronic device according to an embodiment of the present disclosure. The electronic devices may be implemented in various forms, and the electronic devices in the present disclosure may include but are not limited to, mobile phones, smart phones, notebook computers, digital broadcast receivers, personal digital assistants (PDAs), tablet computers (PADS), portable multimedia players (PMPs), navigation devices, in-vehicle electronic equipment, in-vehicle display terminals, in-vehicle electronic rearview mirrors, and other mobile electronic equipment and fixed electronic equipment such as digital TVs and desktop computers.

As shown in FIG. 9, the electronic device 1100 may include a wireless communication unit 1110, an audio/video (A/V) input unit 1120, a user input unit 1130, a sensing unit 1140, an output unit 1150, a memory 1160, an interface unit 1170, a controller 1180 and a power supply unit 1190 and so on. FIG. 9 illustrates an electronic device having various components, but it should be understood that it is not required to include all of the components shown, and more or fewer components may be included.

The wireless communication unit 1110 allows radio communication between the electronic device 1100 and a wireless communication system or network. The A/V input unit 1120 is used to receive audio or video signals. The user input unit 1130 may generate input data according to commands input by the user to control various operations of the electronic device. The sensing unit 1140 detects the current state of the electronic device 1100, the position of the electronic device 1100, the presence or absence of a user's touch input to the electronic device 1100, the orientation of the electronic device 1100, the acceleration or deceleration movement and direction of the electronic device 1100, and generates commands or signals for controlling the operation of the electronic device 1100, The interface unit 1170 serves as an interface through which at least one external device may be connected to the electronic device 1100. The output unit 1150 may be configured to provide output signals in a visual, auditory, and/or tactile manner. The memory 1160 may store the processing executed by the controller 1180 and the software program that controls the operation and so on, or may temporarily store the data that has been output or will be output. The memory 1160 may include at least one type of storage medium. Also, the electronic device 1100 may cooperate with a network storage device that performs the storage function of the memory 1160 through a network connection. The controller 1180 generally controls the overall operation of the electronic device. In addition, the controller 1180 may include a multimedia module for reproducing or playing back multimedia data. The controller 1180 may perform a pattern recognition process to recognize handwriting input or picture drawing input performed on the touch screen as characters or images. The power supply unit 1190 receives external power or internal power under the control of the controller 1180 and provides appropriate power required to operate various elements and components.

Various embodiments of the method for pushing a video content proposed by the present disclosure may be implemented by using a computer software, a hardware, or any combination thereof. For hardware embodiments, various embodiments of the method for pushing a video content proposed by the present disclosure may be implemented by using an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, at least one of the electronic units designed to perform the functions described herein. In some cases, various embodiments of the method for pushing a video content proposed by the present disclosure may be implemented in the controller 1180. For software embodiments, various embodiments of the method for pushing a video content proposed by the present disclosure may be implemented with separate software modules that allow at least one function or operation to be performed. The software codes may be implemented by software applications (or programs) written in any suitable programming language, and the software codes may be stored in the memory 1160 and executed by the controller 1180.

In the description of this specification, the description according to "an embodiment", "some embodiments", "examples", "specific examples", or "some examples" means that specific features, structures, materials or characteristics described in conjunction with the embodiment or examples are included in at least one embodiment or example of the present disclosure. In this specification, the exemplarily expressions of the above terms do not necessarily refer to the same embodiment or example. Moreover, the specific features, structures, materials, or characteristics described may be combined in any suitable manner in any of one or more embodiments or examples. In addition, without contradicting with each other, those skilled in the art may combine and merge different embodiments or examples and features of the different embodiments or examples described in this specification.

In addition, the terms "first" and "second" are used for description purposes only, and cannot be understood as indicating or implying relative importance or implicitly indicating the member of technical features. Thus, the features defined with "first" and "second" may include at least one of the features either explicitly or implicitly. In the description of the present disclosure, the meaning of "a plurality of" is at least two, for example, two, three, etc., unless specifically defined otherwise.

Any process or method description in a flowchart or otherwise described herein may be understood as representing a module, segment, or portion of code that includes one or more executable instructions for implementing steps of custom logic functions or a process. The scope of the preferred embodiments of the present disclosure includes additional implementations, in which the functions may not be performed in the order shown or discussed, including performing functions in a substantially simultaneous manner or in reverse order, which should be understood by those skilled in the art.

Although the embodiments of the present disclosure have been shown and described above, it should be understood that the above-mentioned embodiments are exemplary and cannot be construed as limitations to the present disclosure, and those skilled in the art may make change, modification, replacement, and variants on the embodiments.

What is claimed is:

1. A method for pushing a video content, comprising:
    activating a standby disaster recovery system when a primary disaster recovery system of a video recommendation service fails;
    receiving a video access request sent by an application client, and invoking a first historical video content stored in a middleware and obtained at a preset ratio from historical recommendation videos of the video recommendation service; and
    pushing the first historical video content to the application client for playback.

2. The method of claim 1, further comprising:
    recording a corresponding relationship between a first video identifier of the first historical video content and a user identifier of the application client; and
    filtering video contents to be pushed to the application client based on the first video identifier after the video recommendation service or the primary disaster recovery system is recovered.

3. The method of claim 1, further comprising:
    detecting whether a video content module fails; and
    activating a first interface of the standby disaster recovery system associated with the middleware when the video content module fails; and
    wherein the invoking the first historical video content comprises:
    invoking the first historical video content stored in the middleware and obtained at the preset ratio from historical recommendation videos of the video recommendation service by using the first interface of the standby disaster recovery system.

4. The method of claim 3, further comprising:
    activating a second interface of the standby disaster recovery system associated with a local file when the video content module operates normally;
    invoking a second video identifier stored in the local file and obtained at a preset ratio from historical recommendation videos of the video recommendation service by using a second interface of the standby disaster recovery system;
    obtaining a second historical video content corresponding to the second video identifier from the video content module; and
    sending the second historical video content to the application client.

5. The method of claim 3, further comprising:
disactivating the primary disaster recovery system and the standby disaster recovery system when the video recommendation service is recovered;
receiving a video access request sent by the application client, and obtaining a third video identifier corresponding to a user preference feature of the application client; and
obtaining a third video content corresponding to the third video identifier from the video content module, and sending the third video content to the application client.

6. An electronic device, comprising a processor and a memory,
wherein the processor executes programs corresponding to executable codes stored in the memory by reading the executable codes to implement the method for pushing a video content, the programs comprising executable codes for:
activating a standby disaster recovery system when a primary disaster recovery system of a video recommendation service fails;
receiving a video access request sent by an application client, and invoking a first historical video content stored in a middleware and obtained at a preset ratio from historical recommendation videos of the video recommendation service; and
pushing the first historical video content to the application client for playback.

7. A non-transitory computer-readable storage medium comprising a computer program operable to, when executed by a processor, implement the method for pushing a video content, the method comprising:
activating a standby disaster recovery system when a primary disaster recovery system of a video recommendation service fails;
receiving a video access request sent by an application client, and invoking a first historical video content stored in a middleware and obtained at a preset ratio from historical recommendation videos of the video recommendation service; and
pushing the first historical video content to the application client for playback.

8. The electronic device of claim 6, wherein the programs further comprise executable codes for:
recording a corresponding relationship between a first video identifier of the first historical video content and a user identifier of the application client; and
filtering video contents to be pushed to the application client based on the first video identifier after the video recommendation service or the primary disaster recovery system is recovered.

9. The electronic device of claim 6, wherein the programs further comprise executable codes for:
detecting whether a video content module fails; and
activating a first interface of the standby disaster recovery system associated with the middleware when the video content module fails; and
wherein the invoking the first historical video content comprises:
invoking the first historical video content stored in the middleware and obtained at the preset ratio from historical recommendation videos of the video recommendation service by using the first interface of the standby disaster recovery system.

10. The electronic device of claim 9, wherein the programs further comprise executable codes for:
activating a second interface of the standby disaster recovery system associated with a local file when the video content module operates normally;
invoking a second video identifier stored in the local file and obtained at a preset ratio from historical recommendation videos of the video recommendation service by using a second interface of the standby disaster recovery system;
obtaining a second historical video content corresponding to the second video identifier from the video content module; and
sending the second historical video content to the application client.

11. The electronic device of claim 9, wherein the programs further comprise executable codes for:
disactivating the primary disaster recovery system and the standby disaster recovery system when the video recommendation service is recovered;
receiving a video access request sent by the application client, and obtaining a third video identifier corresponding to a user preference feature of the application client; and
obtaining a third video content corresponding to the third video identifier from the video content module, and sending the third video content to the application client.

* * * * *